(12) United States Patent
Kokkinen

(10) Patent No.: US 7,984,435 B2
(45) Date of Patent: Jul. 19, 2011

(54) UPDATE SYSTEM EMPLOYING REFERENCE SOFTWARE TO REDUCE NUMBER OF UPDATE PACKAGES

(75) Inventor: Antti Kokkinen, Barnes (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2332 days.

(21) Appl. No.: 10/688,640

(22) Filed: Oct. 17, 2003

(65) Prior Publication Data

US 2004/0168165 A1   Aug. 26, 2004

Related U.S. Application Data

(60) Provisional application No. 60/426,090, filed on Nov. 13, 2002.

(51) Int. Cl.
G06F 9/44 (2006.01)
G06F 9/445 (2006.01)

(52) U.S. Cl. .................... 717/170; 717/169; 717/175

(58) Field of Classification Search .................. None
See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,960,445 A | 9/1999 | Tamori et al. | 707/203 |
| 6,009,497 A | 12/1999 | Wells et al. | 711/103 |

(Continued)

FOREIGN PATENT DOCUMENTS

CA   2339923   3/2000

(Continued)

OTHER PUBLICATIONS

Trendafilov et al., "zdelta: An Efficient Delta Compression Tool", Jun. 26, 2002, Polytechnic University, Brooklyn, New York, pp. 1-14.*

(Continued)

Primary Examiner — Michael J Yigdall
Assistant Examiner — Ben C Wang

(57) ABSTRACT

Disclosed herein is an electronic device having an update agent capable of updating application software employing reference software and an update package generated based on the reference software. The update agent may be employed by the electronic device to perform the update. When a user of an electronic device installs an application software, reference software may also be installed during the same installation to support subsequent updates to the application software. In a personal computer, application software may be loaded from a CDROM that may also provide reference software. Both application software and reference software may be installed during the same installation onto the PC from the CDROM. Update packages may also be generated based on the reference software and the number of update packages to be generated. Disclosed herein is a method and system where multiple update transitions may be reduced to a single update transition.

19 Claims, 4 Drawing Sheets

U.S. PATENT DOCUMENTS

| | | | |
|---|---|---|---|
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,389,592 B1* | 5/2002 | Ayres et al. | 717/172 |
| 6,438,585 B2 | 8/2002 | Mousseau et al. | 709/206 |
| 6,526,574 B1* | 2/2003 | Jones | 717/168 |
| 6,542,906 B2* | 4/2003 | Korn | 707/203 |
| 6,546,552 B1* | 4/2003 | Peleg | 717/170 |
| 6,694,336 B1* | 2/2004 | Multer et al. | 707/201 |
| 6,912,591 B2* | 6/2005 | Lash | 709/246 |
| 6,925,467 B2* | 8/2005 | Gu et al. | 707/101 |
| 6,938,109 B1* | 8/2005 | Sliger et al. | 710/68 |
| 6,952,823 B2* | 10/2005 | Kryloff et al. | 717/170 |
| 6,976,251 B2* | 12/2005 | Meyerson | 717/175 |
| 6,999,976 B2* | 2/2006 | Abdallah et al. | 717/118 |
| 7,058,941 B1* | 6/2006 | Venkatesan et al. | 717/168 |
| 7,143,405 B2* | 11/2006 | Liu et al. | 717/173 |
| 2001/0029178 A1 | 10/2001 | Criss et al. | 455/419 |
| 2001/0044934 A1* | 11/2001 | Hirai et al. | 717/11 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0099726 A1* | 7/2002 | Crudele et al. | 707/200 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0177485 A1* | 9/2003 | Waldin et al. | 717/169 |
| 2004/0062130 A1* | 4/2004 | Chiang | 365/230.03 |
| 2004/0215755 A1* | 10/2004 | O'Neill | 709/223 |
| 2005/0010576 A1* | 1/2005 | Ren et al. | 707/100 |
| 2005/0234997 A1* | 10/2005 | Gu et al. | 707/104.1 |
| 2005/0289533 A1* | 12/2005 | Wang et al. | 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |
| WO | WO 02/41147 A1 * | 5/2002 |

OTHER PUBLICATIONS

"Focus on OpenView a guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

UPDATE SYSTEM EMPLOYING REFERENCE SOFTWARE TO REDUCE NUMBER OF UPDATE PACKAGES

CROSS-REFERENCE TO OTHER APPLICATIONS

The present application claims the benefit of U.S. Provisional patent application having Ser. No. 60/426,090 filed on Nov. 13, 2002, the complete subject matter of which is hereby incorporated herein by reference in its entirety.

The present application also incorporates herein by reference the complete subject matter of U.S. Non-Provisional patent application having Ser. No. 10/125,791, filed Apr. 12, 2002, in its entirety.

The present application also incorporates herein by reference the complete subject matter of U.S. Provisional patent application having Ser. No. 60/249,606, filed Nov. 17, 2000 in it entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices often contain firmware and application software that may either be provided by the manufacturers of the electronic devices, by telecommunication carriers, or by third parties. It may be difficult to update firmware and/or firmware components in electronic devices. The program code or functions employed to update firmware components may also have to be changed or updated. Such program code or functions, when upgraded, may not fit within the memory available in the electronic device (FLASH or other storage). Changes to firmware or firmware components may be performed in a fault tolerant mode. However, fault tolerant methods may be difficult to implement.

Attempts to upgrade firmware and/or application software in electronic devices requires a determination of a source version of an existing firmware/software and also a target version to which updates may be executed. The need to support different versions of firmware/software to support all of the possible version transitions places an enormous burden on software vendors providing updates to firmware/software. For example, if software in an electronic device corresponds to a version 1.1 and newer versions 1.2, 1.3, 1.9 have been created by the vendor, firmware/software updates supporting all possible transitions, such as those from 1.1 to 1.9, 1.2 to 1.9, 1.3 to 1.9, 1.1 to 1.2, 1.1 to 1.3, 1.2 to 1.3, etc., may have to be applied. The explosion in the number of update packages as new versions are released makes it difficult to manage firmware/software update processes. To update an original source version of firmware/software, electronic devices may be upgraded employing appropriate update packages. Often more than one version update may be required and multiple update processes may be conducted.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a method for updating software in an electronic device. The method may comprise generating an update package for updating at least one software application. The update package may be generated based upon at least one reference software installed on the electronic device. The method may also comprise updating the at least one software application using the update package.

In another embodiment of the present invention, generating an update package for updating the at least one software application based upon the at least one reference software installed on the electronic device may comprise accessing the at least one reference software to identify which version of the at least one software application is present on the electronic device. The method may also comprise retrieving update information corresponding to at least a most recently updated version of the at least one software application and generating an update package with the retrieved update information.

In another embodiment of the present invention, update information corresponding to at least a most recently updated version of the at least one software application may comprise update information corresponding to the most recently updated version of the at least one software application and update information corresponding to all intervening version updates presently installed on the electronic device.

In another embodiment of the present invention, the method may further comprise updating multiple update versions of the at least one software application installed on the electronic device with a single update package.

In another embodiment of the present invention, the method may further comprise installing the at least one software application and the at least one reference software as part of a single installation.

In another embodiment of the present invention, the method may further comprise updating the at least one reference software and updating the at least one software application as part of a single update.

In another embodiment of the present invention, the at least one software application may comprise a plurality of software applications and the at least one reference software may comprise a plurality of reference software.

In another embodiment of the present invention, the method may further comprise identifying a software application needing updating from the plurality of software applications installed on the electronic device and identifying whether a reference software corresponding to the software application needing updating is present on the electronic device. If the reference software is not present, then the software application and an associated reference software may be installed in a single update on the electronic device.

In another embodiment of the present invention, the method may further comprise identifying a software application needing updating from the plurality of software applications installed on the electronic device and identifying whether a reference software corresponding to the software application needing updating is present on the electronic device. If the reference software is present, then an update package for the software application needing updating may be retrieved. The method may also comprise verifying the update package and installing the update package on the electronic device.

In another embodiment of the present invention, the method may further comprise identifying a software application needing updating from the plurality of software applications installed on the electronic device. The method may also comprise determining if the update is needed immediately and storing the update until the update is needed immediately.

In another embodiment of the present invention, when the update is determined to be needed immediately, then an update agent may be invoked to employ at least the stored update package and reference software and updating the software application with the update package.

Aspects of the present invention may also be found in a system for updating software. The system may comprise an electronic device capable of having software installed thereon and a software delivery device for receiving and delivering at least one update package and reference software to the electronic device. The reference software may facilitate, using the at least one update package, at least one update to application software installed on the electronic device.

In another embodiment of the present invention, the electronic device may further comprise an update agent. The update agent may be capable of employing the reference software in conjunction with a retrieved update package to generate updated versions of the application software. The update agent may also be capable of updating a plurality of application software employing reference software associated with each application software.

In another embodiment of the present invention, the system may further comprise an update generating system. The update generating system may comprise a loader manager. The loader manager may manage loading of application software and application software version updates from the software delivery device. The loader manager may also employ a loader from a loader module and employ security services to authenticate software being delivered.

In another embodiment of the present invention, the loader manager may further comprise an installation agent for installing application software and downloading files from the software delivery device.

In another embodiment of the present invention, the loader manager may be adapted to identify an application software needing updating, identify whether reference software associated with the application software needing updating exists, and coordinate an update of the application software and an associated reference software in a single update.

In another embodiment of the present invention, the loader manager may be adapted to retrieve the update package, access contents of the update package, and verify the update package.

In another embodiment of the present invention, the loader manager may be adapted to determine the immediacy of a needed update for a particular application software.

In another embodiment of the present invention, the software delivery device may be one of a server, a CDROM, and a network.

In another embodiment of the present invention, the electronic device may be one of a computer, a digital phone, and a digital camera.

Aspects of the present invention may also be found in a method for updating software in an electronic device. The method may comprise generating a first update package for updating at least one software application. The first update package may be generated based upon difference information between first and second software versions. The method may also include generating a second update package for updating the at least one software application. The second update package may be generated based upon difference information between first and third software versions. The method may also include generating a third update package for updating the at least one software application, the third update package being generated based upon difference information between the first and second update packages and updating the at least one software application using the third update package.

Aspects of the present invention may also be found in a method for updating software in an electronic device. The method may comprise generating a first update package for updating at least one software application. The first update package may be generated based upon difference information between a first software version and a reference software corresponding to the at least one software application. The method may also comprise generating a second update package for updating the at least one software application. The second update package may be generated based upon difference information a second software version and the reference software corresponding to the at least one software application. The method may also include generating a third update package for updating the at least one software application, the third update package being generated based upon difference information between the first and second update packages and updating the at least one software application using the third update package.

Aspects of the present invention may also be found in a system for updating software. The system may comprise an electronic device capable of having software installed thereon, a first update package generator for generating update packages based upon difference information between different versions of software, a second update package generator for generating update packages based upon difference information between different update packages, and a software delivery device for delivering at least one update package generated based upon difference information between different update packages to the electronic device.

Aspects of the present invention may also be found in a system for updating software. The system may comprise an electronic device capable of having software installed thereon, a first update package generator for generating update packages based upon difference information between a version of software and a reference software corresponding to at least one software application, a second update package generator for generating update packages based upon difference information between different update packages, and a software delivery device for delivering at least one update package generated based upon difference information between different update packages to the electronic device.

These and various other advantages and features of novelty which may characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DIAGRAMS

DETAILED DESCRIPTION OF THE DIAGRAMS

Figure 1:
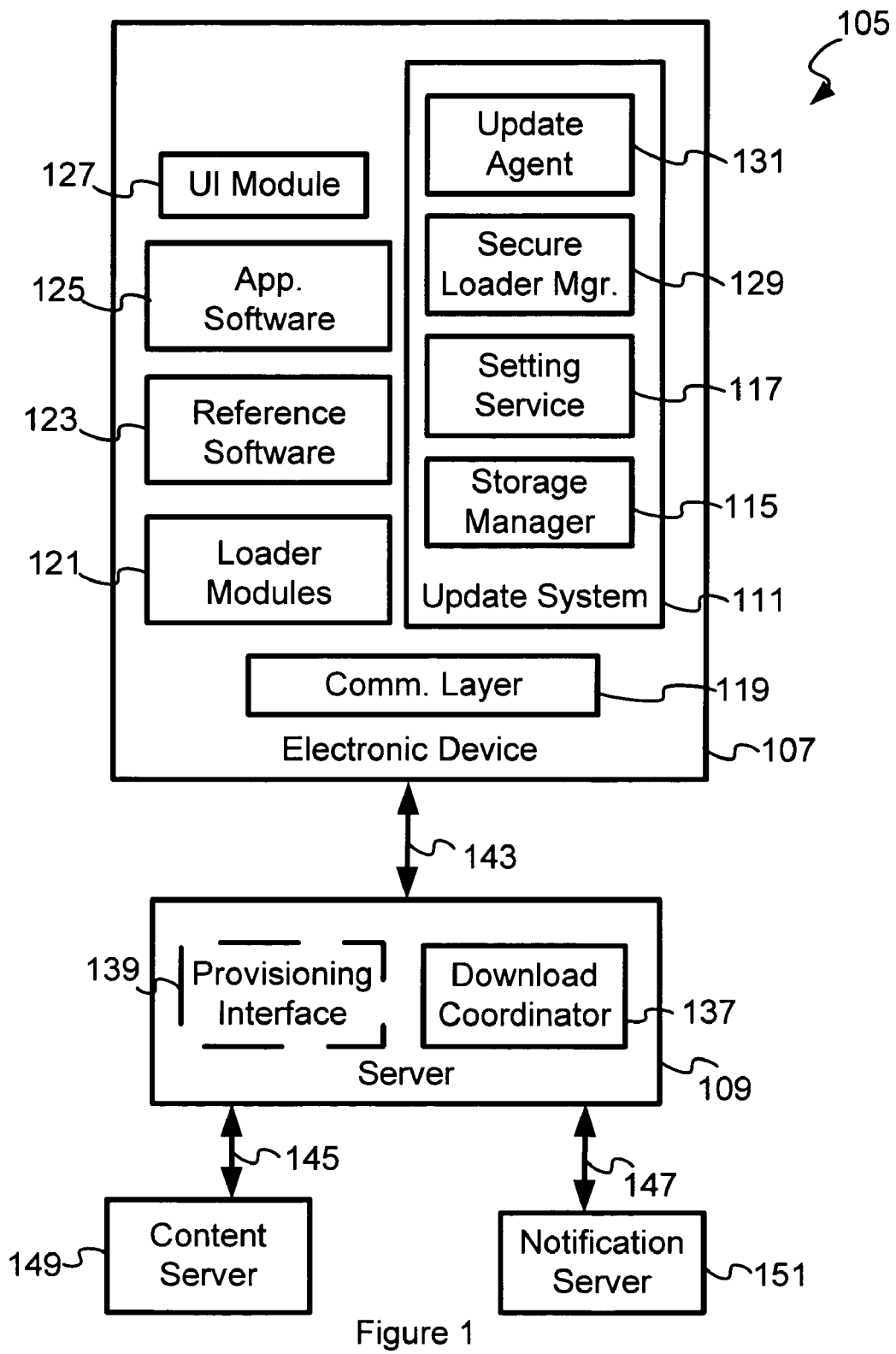
FIG. 1 is a block diagram of an update network that may support update of application software in an electronic device employing an update package provided by a server with a download coordinator, according to an embodiment of the present invention.

FIG. 1 is a block diagram of an update network supporting updating application software in an electronic device by employing an update package. The electronic device may be capable of applying updates to application software and reference software associated with the application software. The reference software may be stored along with the application software in the electronic device.

In FIG. 1, update network 105, that may support update of application software 125 in electronic device 107, is shown. Application software 125 may employ an update package provided by server 109. Server 109 may be provided with download coordinator 137. Electronic device 107 may be capable of applying updates to application software 125 by employing the update package retrieved from server 109 and also reference software 123, which may be associated with application software 125. Reference software 123 may also be stored along with application software 125 within electronic device 107. Electronic device 107 may also comprise update system 111, loader modules 121, user interface (UI) module 127, and communications layer 119.

In an embodiment of the present invention, when a user of electronic device 107 installs application software 125, for example for the first time, reference software 123 may also be simultaneously installed to support subsequent updates to application software 125. For example, in an embodiment of the present invention, electronic device 107 may be a personal computer (PC) and application software 125 may be loaded from a CDROM that may also provide reference software 123. Both application software 125 and reference software 123 may be installed onto PC 107 from the CDROM during the same installation. Reference software may comprise a plurality of shared and/or common binaries, firmware code, dynamic link libraries (DLLs), JAVA archives (JAR files), wherein the above may comprise data and/or textual information common to a plurality of versions of an application software or a plurality of software applications and respective versions thereof.

Subsequent update packages retrieved by PC 107 from server 109 to update application software 125 may be generated based upon reference software 123 (or a copy thereof), for example by the vendor of application software 125. Update agent 131 in PC 107 may be capable of employing reference software 123 in PC 107 in conjunction with a retrieved update package to generate updated versions of application software 125.

Aspects of the present invention may utilize a known reference, such as reference software 123, when updating available software in an electronic device. Reference software 123 may be supplied by the vendor of application software 125, and reference software 123 may be installed along with application software 125. Subsequent updates (for example to version 5.0) applied to the installed software may then be performed based on reference software 123 instead of application software 125 currently in use. This means that for a given updated application software version, only one update package based on reference software 123 may need to be developed and disseminated.

Aspects of the present invention may decrease the need for creating and developing numerous redundant update packages. Multi-version updates may be combined and converted to a single update situation. For example, if application software versions 1, 2, and 3 exist, distributing an updated version of the software, for example version 4, may have required update packages to be generated from versions 1 to 4, 2 to 4, and 3 to 4 using prior art methods. However, by employing an embodiment of the present invention, only one update package may need to be developed, i.e., one update package is capable of supporting the transition from an existing reference software version to updated software version 4.

In an embodiment of the present invention, secure loader manager 129 in update system 111 may be employed to manage loading of application software 125, or version updates thereof. The loading may be from server 109, and may employ communication layer 119 and appropriate loaders in loader modules 121. Alternatively, loading may be from a CDROM, and again may employ appropriate loaders from loader modules 121. Secure loader manager 129 may employ security services such as digital certificates, CRC values, message digests, encryption/decryption mechanisms, etc., to authenticate the application software, update packages downloaded, reference software, etc.

In an embodiment of the present invention, secure loader manager 129 may comprise an installation agent capable of installing application software 125 after it downloads files from a remote server, such as server 109, accesses files from local storage, or accesses files from a CDROM (local or otherwise).

In an embodiment of the present invention, the electronic device 107 may support storage and management of multiple software applications, such as application software 125, where each software application has an associated reference software 123. Thus, an update of any of the multiple software applications in electronic device 107 may utilize an update package based on an associated reference software 123. Update agent 131 may be capable of updating each software application 125 employing an associated reference software 123.

Figure 2:
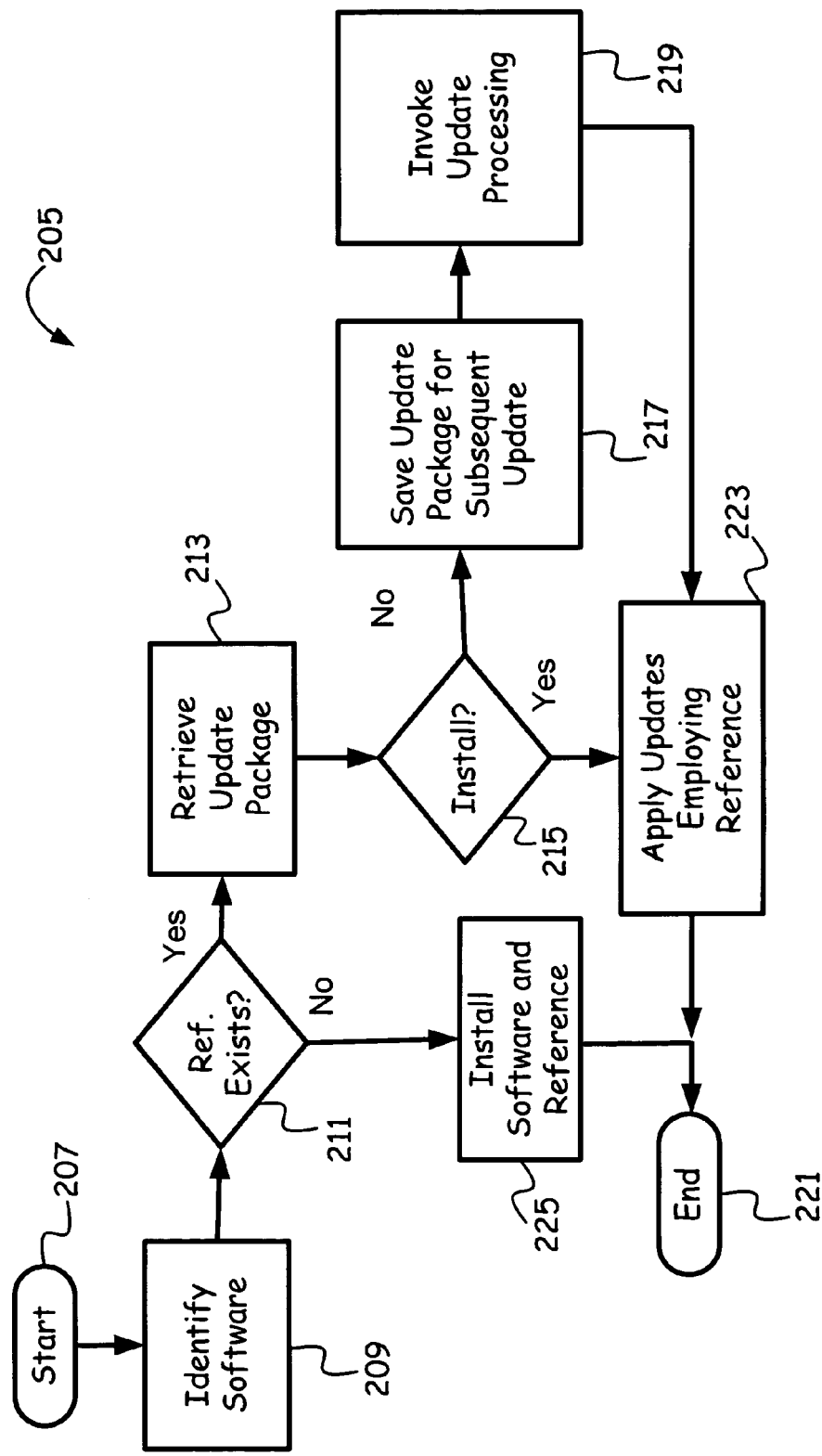
FIG. 2 is a flow chart illustrating an exemplary operation of an electronic device when a specific version of application software is to be installed based on reference software that is locally available, according to an embodiment of the present invention.

FIG. 2 is a flow chart illustrating an exemplary method of operating an electronic device, such as electronic device 107 of FIG. 1, with a specific version of application software 125 using reference software that may be locally available, in accordance with the present invention. At block 207, an installation agent for network-based installation (or a CDROM-based installation) for electronic device 107 may be invoked. At block 209, secure loader manager 129 in electronic device 107 may identify a software application to be updated. At block 211, secure loader manager 129 of electronic device 107 may determine if reference software 123 exists for application software 125 to be updated. If it is determined that reference software 123 does not exist, then at block 225, installation of application software 125 and associated reference software 123 may be performed in electronic device 107. Subsequently, installation may terminate at block 221.

If, at block 211, it is determined that an update to application software 125 may be necessary and that reference software 123 exists, then, at block 213, the update package for application software 125 may be retrieved or accessed by secure loader manager 129. At block 215, the retrieved update package is verified, and a determination is made whether an immediate update is appropriate. If it is determined that an update package may be installed, then control is passed to block 223, where the update agent updates application software 125 using one or more update packages and reference software 123. The update agent may also set appropriate flags to indicate success or failure before processing terminates at block 221.

If, at block 215, it is determined that a downloaded update package need not be immediately installed, then, at block 217, the update package may be saved for subsequent update. Typically, the update package may be saved in storage or in a file system employing a storage manager, such as, for example, storage manager 115 of FIG. 1.

At block 219, update agent 131 may be invoked to apply the update employing one or more update packages and reference software 123. Control is then passed to block 223 where update processing may be performed by update agent 131 before termination at block 221.

In an embodiment of the present invention, electronic device 107 may be capable of updating reference software by employing update packages provided by server 109 or provided on a CDROM.

Aspects of the present invention may be found in an electronic device comprising an update agent that may be capable of updating application software employing reference software and an update package generated based on the reference software. The update agent may be employed by the electronic device to perform the update.

In an embodiment of the present invention, reference software may be installed concurrent with the first installation of an application software update. For example, in a personal computer (PC), application software may be loaded from a CDROM (or over a network) that may also provide reference software, and both application software and reference software may be installed onto the PC during the same installation. Update packages may be generated based on the reference software and the number of update packages needed to support a multi-version update transitions may be reduced to a single update process.

Figure 3:
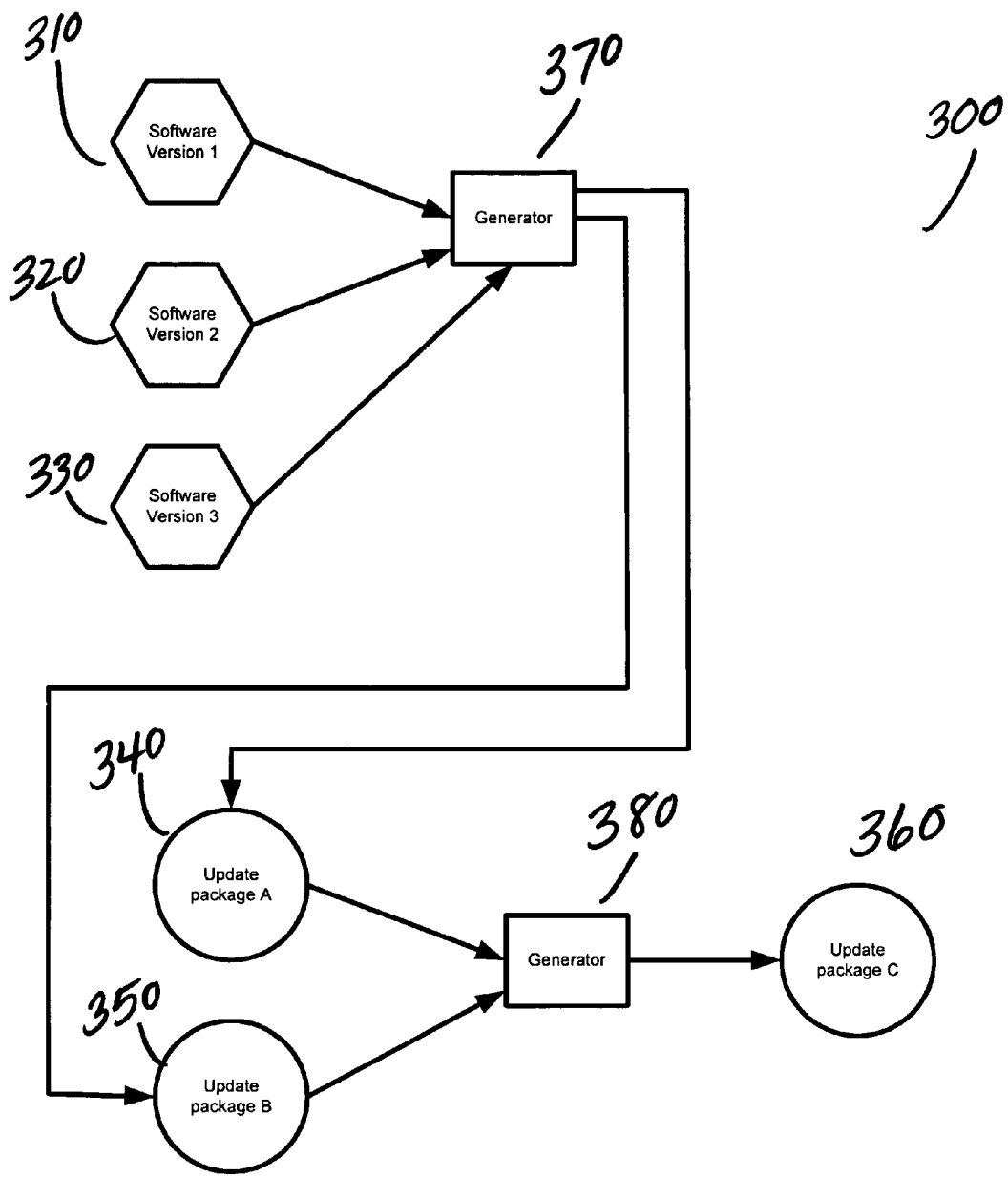
FIG. 3 is a block diagram 300 illustrating creation of an exemplary update package according to an embodiment of the present invention.

FIG. 3 is a block diagram 300 illustrating creation of an exemplary update package according to an embodiment of the present invention. In FIG. 3, an update package may be created using difference information, i.e., the update package may be created based on two or more different generated update packages.

Aspects of the present invention may be found in an exemplary embodiment wherein three different software versions 310, 320 and 330, of a software application are known. The method may be accomplished by generating, in update generator 370, a first update package 340 (update package A) corresponding to differences between software versions 310 and 320, generating, in update generator 370, a second update package 350 (update package B) corresponding to differences between software versions 310 and 330, and generating a third update package 360 (update package C), in update generator 380, corresponding to differences between the first update package 340 and the second update package 350.

In an embodiment of the present invention, the generated third update package 360 may contain less information than the sum of information contained in the first update package 340 and the second update package 350, and may contain less information than either of the first or second update packages 340, 350 alone.

The electronic device to be updated may store the first update package 340 and/or the second update package 350 in order to generate the third update package 360. The second update package 350 may also be generated from an available (previously downloaded) update package. In another embodiment of the present invention, the first update package 340 and a newly downloaded update package, for example the third update package 360, may be applied before applying the second update package 350.

Figure 4:
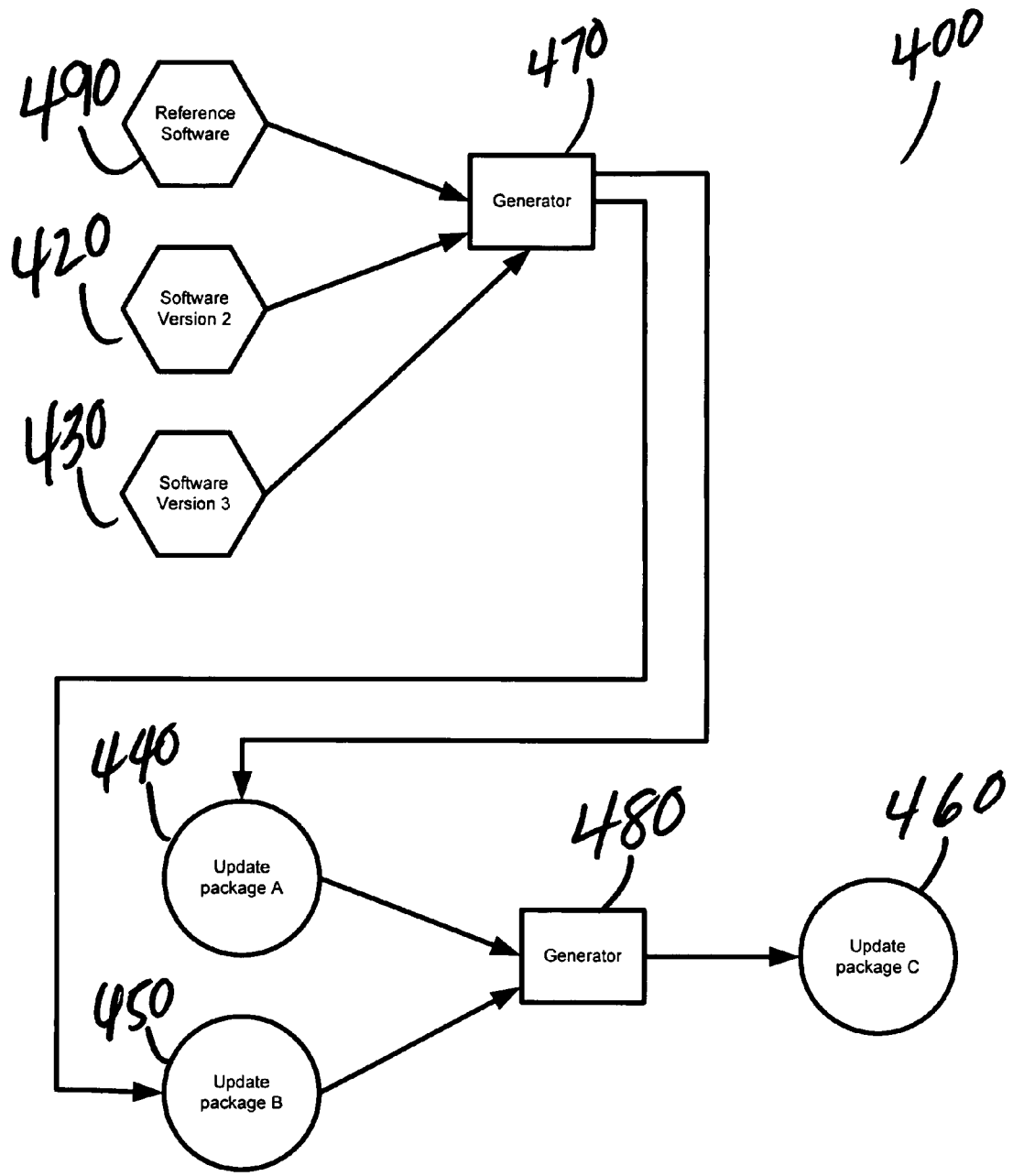
FIG. 4 is a block diagram 400 illustrating creation of another exemplary update package according to an embodiment of the present invention.

FIG. 4 is a block diagram 400 illustrating creation of another exemplary update package according to an embodiment of the present invention. In FIG. 4, an update package may be created using difference information, i.e., the update package may be created based on two or more different generated update packages.

Aspects of the present invention may be found in an exemplary embodiment wherein two different software versions 420 and 430, of a software application are known, and reference software 490 corresponding to a particular software application is also provided. The method may be accomplished by generating, in update generator 470, a first update package 440 (update package A) corresponding to differences between software version 420 and reference software 490, generating, in update generator 470, a second update package 450 (update package B) corresponding to differences between software versions 430 and reference software 490, and generating a third update package 460 (update package C), in update generator 480, corresponding to differences between the first update package 40 and the second update package 450.

In an embodiment of the present invention, the generated third update package 460 may contain less information than the sum of information contained in the first update package 440 and the second update package 450, and may contain less information than either of the first or second update packages 440, 450 alone.

The electronic device to be updated may store the first update package 440 and/or the second update package 450 in order to generate the third update package 460. The second update package 450 may also be generated from an available (previously downloaded) update package. In another embodiment of the present invention, the first update package 440 and a newly downloaded update package, for example the third update package 460, may be applied before applying the second update package 450.

The electronic device to be updated may store the first update package 440 after it has been used to update the electronic device so that it may be used to generate subsequent update packages, such as the second update package 450, which would be generated when the electronic device subsequently downloads the third update package 460. Thus, the third update package 460 and the first update package 440 would be used to generate the second update package 450 at the electronic device, prior to the update of the electronic device using the second update package 450. It is assumed that the third update package 460 is smaller than the second update package 450, thereby making it more efficient to transfer the third update package 460 to the electronic device rather than the second update package 450.

Although a system and method according to the present invention has been described in connection with a preferred embodiment, the invention is not intended to be limited to the specific form set forth herein, but on the contrary, is intended to cover such alternative modifications and equivalents, as can be reasonably included within the spirit and scope of the invention, as defined by this disclosure and the appended diagrams. It is intended that the scope of the invention be limited not with this detailed description, but rather by the claims appended hereto.

What is claimed is:

1. A method executed by a central processing unit for updating software in an electronic device, the method comprising:
    generating an update package for updating at least one software application, the update package being generated based upon difference information between the at least one software application and at least one reference software installed on the electronic device;
    updating the at least one software application using the update package and the at least one reference software;
    wherein the updating leaves the at least one reference software unchanged and the at least one reference software includes files common to a plurality of versions of the software application; and
    wherein the files common to a plurality of versions of the software application includes at least one of binaries, firmware code, dynamic link libraries (DLLs), and JAVA archives (JAR files) with at least one software application.

2. The method according to claim 1, wherein the update package is performed based on the reference software installed on the electronic device instead of the software package such that only one update package is disseminated to update multiple different versions of the software application.

3. The method according to claim 1, further comprising updating multiple update versions of the at least one software application installed on the electronic device is performed using a single update package.

4. The method according to claim 1, further comprising installing the at least one software application and the at least one reference software as part of a single installation.

5. The method according to claim 1, further comprising updating the at least one reference software and updating the at least one software application as part of a single update.

6. The method according to claim 1, wherein the at least one software application comprises a plurality of software applications, and the at least one reference software comprises a plurality of reference software.

7. The method according to claim 6, further comprising:
    identifying a software application needing updating from the plurality of software applications installed on the electronic device; and
    identifying whether a reference software corresponding to the software application needing updating is present on the electronic device, wherein if the reference software is not present, then installing the software application and an associated reference software in a single update on the electronic device.

8. The method according to claim 6, further comprising:
    identifying a software application needing updating from the plurality of software applications installed on the electronic device; and
    identifying whether a reference software corresponding to the software application needing updating is present on the electronic device, wherein if the reference software is present, then retrieving an update package for the software application needing updating;
    verifying the update package; and
    installing the update package on the electronic device.

9. The method according to claim 6, further comprising:
    identifying a software application needing updating from the plurality of software applications installed on the electronic device;
    determining if the update is needed immediately; and
    storing the update until the update is needed immediately.

10. The method according to claim 9, wherein when the update is determined to be needed immediately, then
    invoking an update agent to employ at least the stored update package and reference software; and
    updating the software application with the update package.

11. A system for updating software, the system comprising:
    an electronic device capable of having software installed thereon;
    a software delivery device for receiving and installing a reference software to the electronic device if the electronic device does not have the reference software previously installed;
    the software delivery device receiving and delivering at least one update package to the electronic device, wherein the at least one update package is based on differences between at least one application software and the reference software, and the reference software facilitates, using the at least one update package, at least one update to the application software installed on the electronic device, and wherein the updating leaves the reference software unchanged, and the reference software includes a plurality of shared files with the application software; and
    wherein the plurality of shared files include at least one of binaries, firmware code, dynamic link libraries (DLLs), and JAVA archives (JAR files) with at least one software application.

12. The system according to claim 11, further comprising an update generating system, the update generating system comprising a loader manager, the loader manager:
    managing loading of application software and application software version updates from the software delivery device;
    employing a loader from a loader module; and
    employing security services to authenticate software being delivered.

13. The system according to claim 12, wherein the loader manager is adapted to:
    identify an application software needing updating;
    identify whether reference software associated with the application software needing updating exists; and
    coordinating an update of the application software and an associated reference software in a single update.

14. The system according to claim 12, wherein the loader manager is adapted to:
    retrieve the update package;
    access contents of the update package; and
    verify the update package.

15. The system according to claim 12, wherein the loader manager is adapted to determine immediacy of a needed update for a particular application software.

16. The system according to claim 11, wherein the software delivery device is one of a server, a Compact Disk Read-only memory (CDROM), and a network.

17. The system according to claim 11, wherein the electronic device is one of a computer, a digital phone, and a digital camera.

18. A method executed by a central processing unit for updating software in an electronic device, the method comprising:
    generating a first update package for updating at least one software application, the first update package being generated based upon difference information between a first software version and a reference software corresponding to the at least one software application;

generating a second update package for updating the at least one software application, the second update package being generated based upon difference information between a second software version and the reference software corresponding to the at least one software application;

generating a third update package for updating the at least one software application, the third update package being generated based upon difference information between the first and second update packages;

updating the at least one software application using the third update package, wherein the reference software includes files common to the at least one software application and to the second software version; and wherein the files common to the at least one software application and to the second software version include at least one of binaries, firmware code, dynamic link libraries (DLLs), and JAVA archives (JAR files) with at least one software application.

19. A system for updating software, the system comprising:

an electronic device capable of having software installed thereon;

a first update package generator for generating update packages based upon difference information between a version of software and a reference software corresponding to at least one software application;

a second update package generator for generating update packages based upon difference information between different update packages; and a software delivery device for delivering at least one update package generated based upon difference information between different update packages to the electronic device, wherein the reference software includes at least one of a plurality of shared binaries, firmware code, dynamic link libraries (DLLs), and JAVA archives (JAR files) with the at least one software application.

* * * * *